Oct. 25, 1966  E. J. KING, JR  3,281,846
PHASE DISCRIMINATION AND AMPLITUDE COMPARISON
APPARATUS AND METHOD
Filed Aug. 14, 1963  3 Sheets-Sheet 1

INVENTOR.
Edward J. King Jr.
BY
Scofield, Kokjer, Scofield & Lowe
ATTORNEYS.

INVENTOR.
Edward J. King Jr.

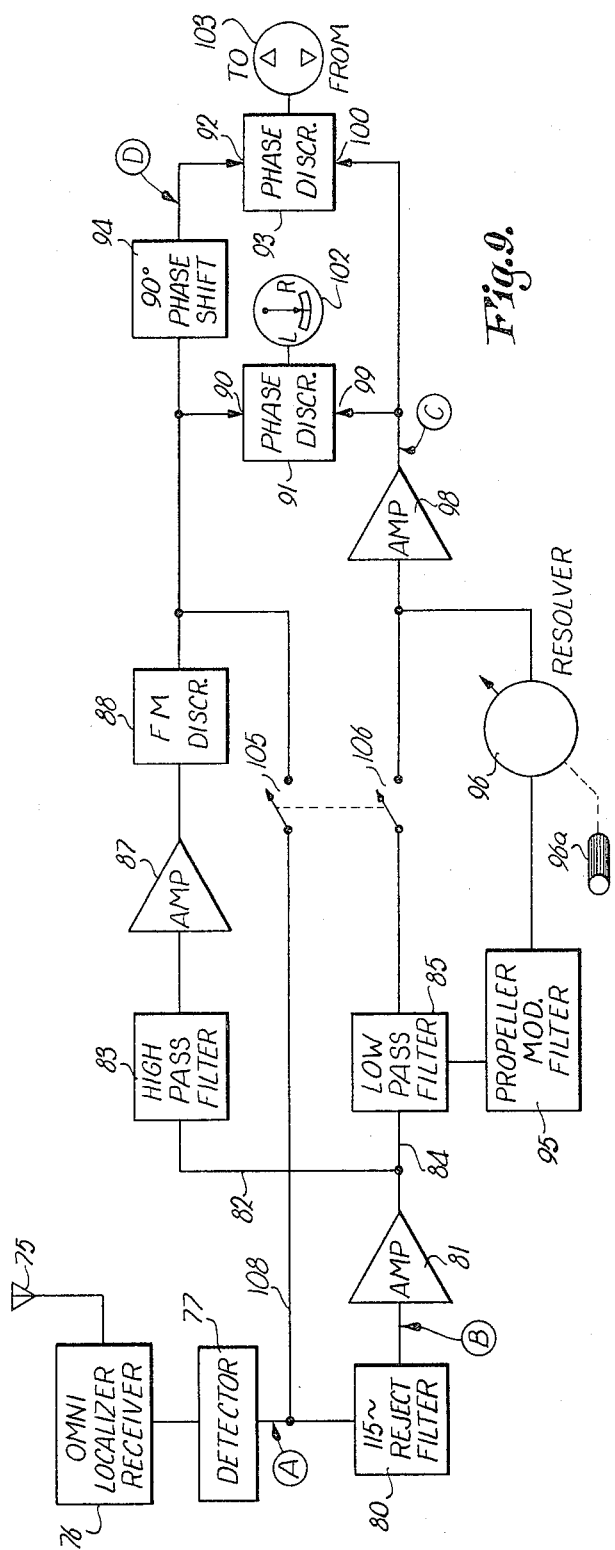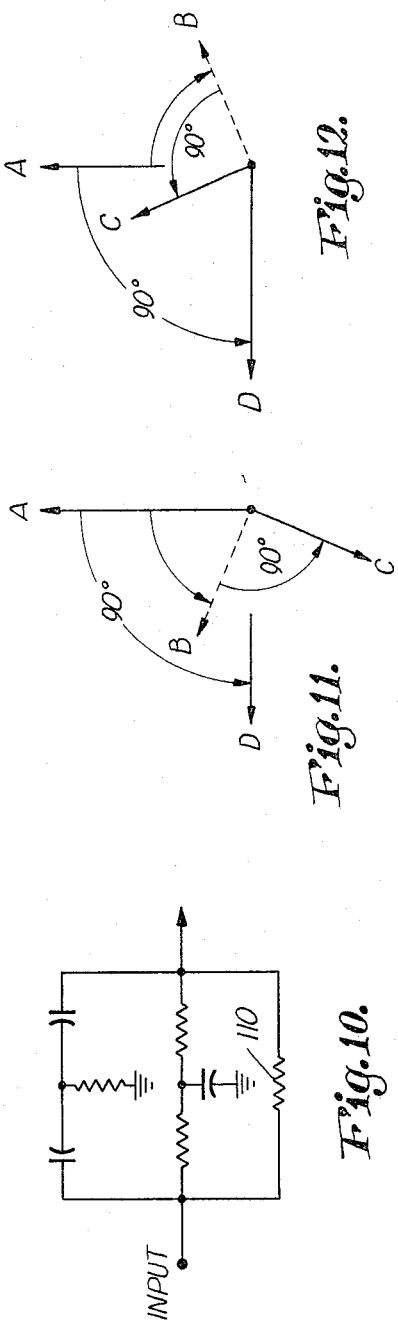

United States Patent Office 3,281,846
Patented Oct. 25, 1966

3,281,846
PHASE DISCRIMINATION AND AMPLITUDE COMPARISON APPARATUS AND METHOD
Edward J. King, Jr., Shawnee Mission, Kans., assignor to King Radio Corporation, Inc., Olathe, Kans., a corporation of Kansas
Filed Aug. 14, 1963, Ser. No. 302,123
28 Claims. (Cl. 343—107)

The present invention relates in general to electrical methods and systems, and it deals more particularly with the art of converting electrical quantities from one form to another, or into suitably useful information.

It is one of the principal objects of the invention to provide a new and useful method of, and apparatus for, comparing the amplitude of two alternating current signals differing from one another in frequency.

It is also an object to derive from the signals in question an electrical quantity indicative of their combined signal strength or amplitude. According to the invention, the sum and difference factors can be obtained simultaneously and continuously in a unique way.

A further object is to provide a combined converter whose response at times will be governed by the phase relationship of received signals and at other times will be governed by other characteristics of the signals (such as amplitude, for example) that are in fact quite foreign to considerations of phase.

In the latter connection, another very important object is to provide novel methods and circuitry for utilizing a phase discriminator in measuring or comparing nonphase quantities. A significant feature of the invention resides in shifting the nonphase quantities arbitrarily into known phase relationships, and in applying them to a phase discriminator in such a way that the latter will respond in terms of the sum or difference of the nonphase quantities.

Collateral to this, a more specific objective is to provide improved flight control equipment for aircraft, more particularly a converter capable of operating in the omnirange mode (to furnish the pilot with bearing information while en route from city to city) and also in the localizer mode (to furnish "left-right" guidance relative to an airport runway in the course of the landing approach). Although the omni mode of operation requires a comparison of phase of two signals and the localizer operation requires a comparison of amplitude of the guidance signals—the kinds of signals, the function and the character of operation being altogether different in the respective cases—the present invention permits combining them and unitizing the circuitry to a degree not heretofore possible, with very substantial improvement in performance and reliability, yet with simplification of the equipment that makes for compactness, reduced weight, lower manufacturing costs and other advantages.

With these ends in mind it is, of course, an important object to provide a localizer converter in which the necessary comparison of the strength of the localizer signals can be made by a phase discriminator.

It is also an object to provide a warning in the event of signal failure or in the event that the received localizer signals are too weak to permit reliable comparison. As to this, a feature of the invention resides in utilizing a phase discriminator to provide an indication of the aggregate strength of the received signals.

Other and further objects of the invention, together with features of novelty whereby the objects are achieved, will appear in the course of the following description.

In the drawings which form a part of the specification and are to be read in conjunction therewith, and in which like reference numerals refer to like parts in the various views.

Figure 4:
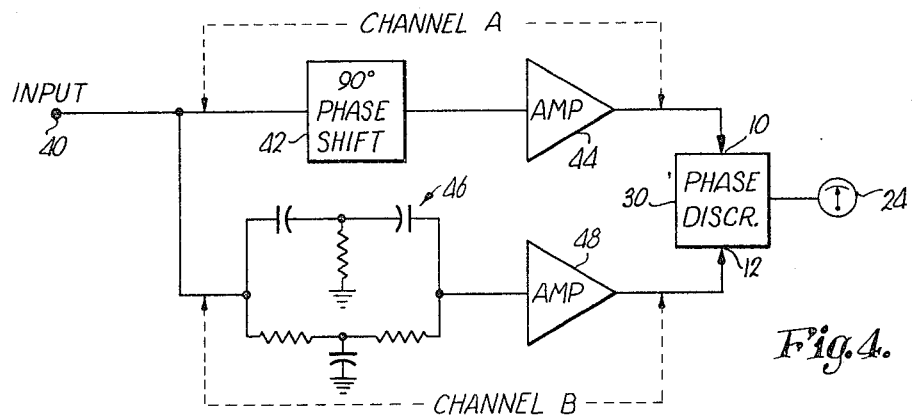
Figure 7:
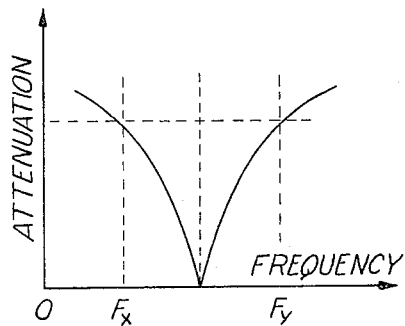
Figure 8:
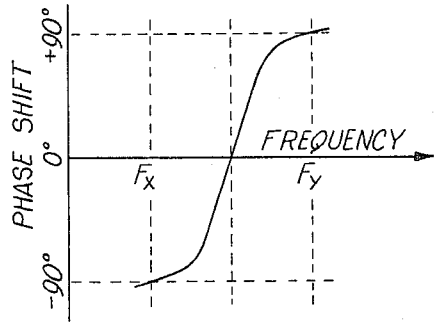

FIGS. 3 to 6, inclusive, are simplified schematic and/or block diagrams illustrating various ways in which a phase discriminator can be utilized according to the invention to compare the strength or amplitude of two signals differing in frequency;

FIGS. 7 and 8 are graphs showing, respectively, the attenuation characteristic and the phase shift characteristic of a parallel T filter network of the type illustrated in FIG. 4;

FIG. 9 is a block diagram of an omni-localizer converter embodying the invention;

FIG. 10 is a circuit diagram of the 115 c.p.s. reject filter employed in the converter; and FIGS. 11 and 12 are vector diagrams showing phase relationships existing at certain points in my improved converter circuit when it is used in the localizer mode.

Figure 1:
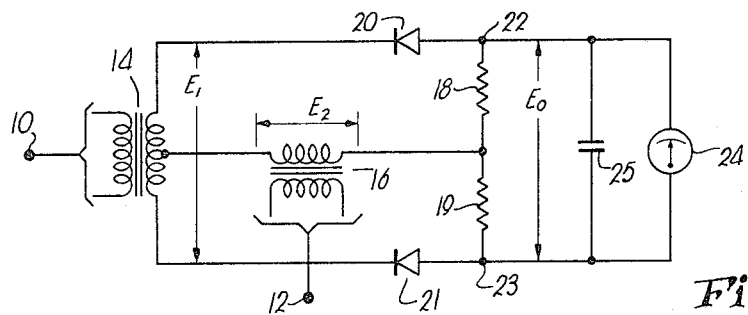
FIG. 1 is a schematic circuit diagram of a phase discriminator suitable for use in the present invention.

Virtually any type of phase discriminator can be employed in carrying out my invention, and it will assist in the understanding thereof to refer first to the exemplary unit shown in FIG. 1, it being understood that this is intended to be illustrative rather than limiting. Sometimes referred to as a half-wave or balanced modulator type of phase discriminator, this unit has two inputs 10 and 12 which, under operating conditions, produce voltages $E_1$ and $E_2$ across the secondary windings of the associated input transformers 14 and 16. The transformers are connected as shown to resistors 18, 19 and diodes 20, 21 to form a balanced network in which transformer 14 has a push-pull output to the cathodes of the diodes.

Although the voltage $E_0$ developed across the output terminals 22, 23 can be utilized in any desired way for control, indication or other purposes, it is shown here for convenience as being impressed on a D.C. meter 24 of the "zero center" type. The meter thus will move to the left or right of center depending upon whether the polarity of terminal 22 is positive relative to terminal 23, or vice versa. A capacitor 25 bridging the meter is provided to smooth the ripple in the applied D.C. voltage.

Figure 2:
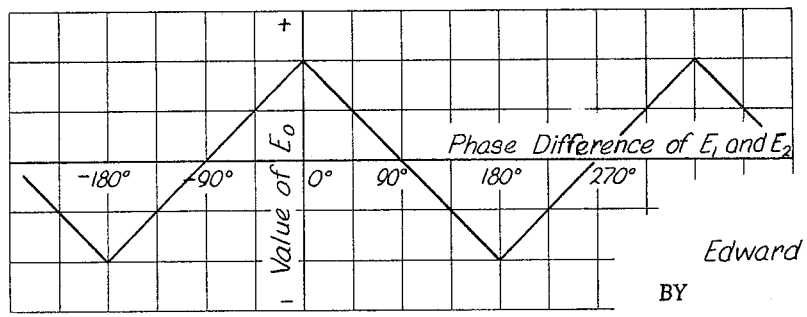
FIG. 2 is a graph showing the manner in which the discriminator's output is affected by the degree of phase difference between the input signals received by the discriminator.

Let it be assumed that a pair of alternating current signals of the same frequency are impressed on inputs 10 and 12, producing voltages $E_1$, $E_2$ and $E_0$, as shown. If one of the input voltages $E_1$ or $E_2$ now is shifed in phase relative to the other, the output voltage $E_0$ will vary substantially as shown in FIG. 2. As will be seen, $E_0$ is zero when the input voltages are in quadrature phase relation, and there naturally will be no movement of meter 24 in either direction under this condition.

When the phase angle is zero, that is to say when the input voltages are in phase, the output voltage $E_0$ has a maximum value in a positive sense; and when the input voltages $E_1$ and $E_2$ are 180° out of phase, the output voltage $E_0$ has a maximum value in a negative sense. The magnitude of the output voltage $E_0$ is the same in the latter cases, but due to the difference in polarity, meter 24 will be caused to swing to the right when the input voltages are in phase and to swing to the left when the same input voltages are 180° out of phase.

I have discovered that this can be put to use in comparing the strength or amplitude of two signals which differ in frequency. It will be convenient to refer to these as signal X and signal Y, the former having a frequency $F_x$ and the latter a frequency $F_y$. I have ascertained that if signal X is impressed on the discriminator inputs 10 and 12 in such a way as to be in phase at the respective inputs (which urges meter 24 toward the right) and if, at the same time, signal Y is impressed on both inputs in such a way as to be 180° out of phase at the respective inputs (which urges meter 24 toward the left) then the output voltage $E_0$—and hence the position taken by the meter 24—will be a function of the difference in amplitude of the signals X and Y.

Figure 3:
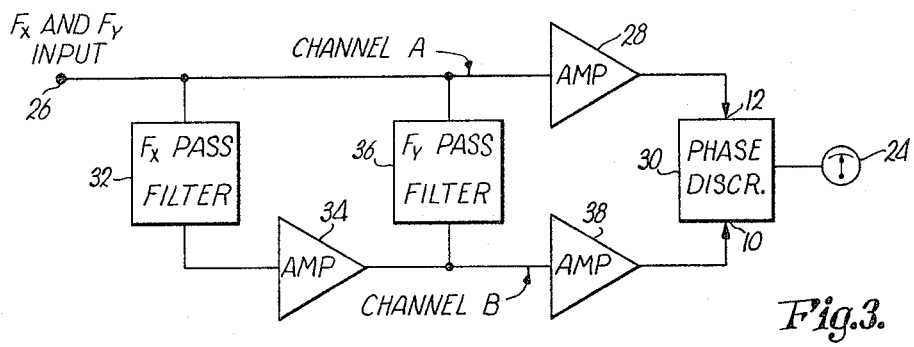

Impressing the respective signals on the two inputs of a frequency discriminator in such proper phase relationship as to achieve this end can be accomplished in various ways. One suitable arrangement is shown in FIG. 3. Here, when impressed at the same time on input 26, signals X and Y travel directly to input 12 of the phase discriminator 30 via channel A which contains an amplifier 28.

A filter 32 removes signal Y but passes signal X on to amplifier 34; another filter 36 removes signal X but passes signal Y. Accordingly signal X from amplifier 34 and signal Y from filter 36 are brought back together in channel B, which then carries them via amplifier 38 to the other input 10 of the phase discriminator 30.

In considering phase relationships of signal X in different parts of the circuit, it sometimes will be convenient to designate the signal as $X_a$ if it is in channel A, or as $X_b$ if it is in channel B; and signal Y likewise can be designated as $Y_a$ or $Y_b$, according to channel.

It should be understood first that each of the amplifiers shown in FIG. 3 produces a 180° phase shift of the signals advancing therethrough. However, it can be assumed that the phase of signal X does not shift in passing through filter 32, and similarly that no phase shift of signal Y occurs in passing through filter 36. Accordingly signal $Y_b$ reaches the input of amplifier 38 in phase with signal $Y_a$ at the input of amplifier 28. Amplifiers 28 and 38 then produce identical 180° phase shifts so that signals $Y_a$ and $Y_b$ still are in phase at the inputs 10 and 12 of discriminator 30.

Such is not true of signal X, however. When signal $X_b$ reaches the input of amplifier 38 it has already been shifted 180° by its passage through amplifier 34 and, as compared with signal $X_a$ at the input of amplifier 28, is 180° out of phase. Inasmuch as amplifiers 28 and 38 produce identical phase shifts, signals $X_a$ and $X_b$ are 180° out of phase when impressed on the discriminator inputs 10 and 12.

FIG. 3 thus exemplifies a simple and entirely practical way of comparing the strength or amplitude of two signals by delivering one of them to both inputs of discriminator 30 in phase, while delivering the other signal to the same inputs but in 180° out-of-phase relation.

It should be explained that in carrying out my invention one of the two discriminator inputs is selected to serve as a "phase-reference" input, while the other serves as a primary "control" input in the sense of governing the voltage or meter indication that will be produced at the output of the discriminator. Input 10 can be the phase-reference input and 12 the control input, or vice versa. Referring to FIG. 1, if it is elected to make 10 the phase-reference input, voltage $E_1$ should be made at least double the value of $E_2$; in practice I prefer to make it substantially more, for example by providing relatively greater amplification in the channel that feeds into the reference input than in the channel that feeds into the control input. On the other hand, if 12 is to be the phase-reference input, voltage $E_2$ should be made substantially larger than the value of $E_1$.

By making one of the aforementioned input voltages sufficiently large in relation to the other and by operating the discriminator on a fixed-phase-relation basis as contemplated by the invention, the value of output voltage $E_0$ is made dependent mainly or almost entirely on the value of the smaller one of the two input voltages. For convenience and consistency throughout the present explanation it will be assumed arbitrarily that 10 is the phase reference input and 12 is the control input. Thus, 12 may be regarded as a relatively lower level input than 10, in terms of the strength of the signals received by it.

Since the voltage or meter indication produced at the output of the phase discriminator 30 (FIG. 3) depends upon the relative strength of the signals received at the control input (12)—not upon the relative strength of the signals received at the phase-reference input (10)—it is important that signals X and Y, in passing from input 26 through channel A to control input 12, be amplified or attenuated similarly, so that the effective level or amplitude of the two signals at the control input is in essentially the same relationship as their relative amplitude at input 26. However, it is not essential that this relationship be preserved in the channel that feeds into the phase-reference input 10 of the discriminator for, as has been pointed out, the amplitude of the signals received at the latter input has little or no effect on the output voltage of the phase discriminator. The same general considerations obtained in the other embodiments of my invention which will be discussed hereinafter.

FIG. 4 shows another suitable arrangement for feeding two signals X and Y to the inputs of a phase discriminator 30 in such proper phase relationship that the output of a discriminator will reflect the difference in amplitude of the signals. Here, when the two signals are applied in superimposed relation at the input 40 they travel via channel A to the input 10 of the phase discriminator and via channel B to the discriminator input 12.

Channel A contains a network 42 that serves to shift signals X and Y by −90° before applying them to the input of amplifier 44. Channel B contains a parallel T-section network 46 followed by an amplifier 48. The attenuation characteristic of network 46 is shown in FIG. 7, from which it will be evident that signals X and Y are attenuated equally in passing therethrough. More important, as can be seen from its phase characteristic (FIG. 8) network 46 also serves to shift signal X by −90° and signal Y by +90°, as they pass therethrough.

Thus, signal X is shifted −90° in channel A by means of the network 42 and in channel B it is shifted exactly the same amount in the same direction by network 46, so that, as applied to the inputs of amplifiers 44 and 48 signals $X_a$ and $X_b$ are in phase. However, signals $Y_a$ and $Y_b$ are 180° out of phase at the inputs of the respective amplifiers, by reason of signal $Y_a$ having been shifted −90° in passing through network 42 and signal $Y_b$ having been shifted +90° by the parallel T network 46. As amplifiers 44 and 48 produce identical phase shifts it again will be evident that one pair of signals ($X_a$ and $X_b$) are in phase at the discriminator inputs 10 and 12, while the remaining pair ($Y_a$ and $Y_b$) are 180° out of phase. Accordingly, the discriminator 30 once more will function as an amplitude comparator in the fashion already outlined.

Figure 5:
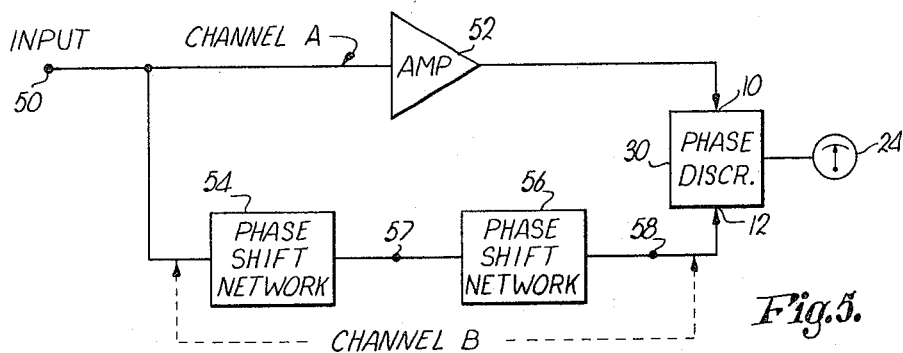

Identically the same results are obtained in a somewhat different way in the arrangement shown in FIG. 5. With signals X and Y impressed on input 50 they travel directly to the discriminator input 10 via channel A, which contains an amplifier 52. In channel B there are two phase shift networks 54 and 56 through which signals X and Y travel en route to the other discriminator input 12.

Let it be assumed that network 54 shifts both signals by −90° and that network 56 is a parallel T section of the kind shown in FIG. 4, which is to say that it shifts signal X by −90° and signal Y by +90°. The net shift of signal Y after passing through both networks therefore is zero and, having in mind that amplifier 52 shifts all signals passing therethrough by −180°, it will be seen that signals $Y_a$ and $Y_b$ are 180° out of phase when applied to inputs 10 and 12 of the discriminator 30.

On the other hand, inasmuch as signal X is shifted −90° by network 54 and an additional −90° by network 56 the total shift is −180° which corresponds exactly, in amount and direction, to the phase shift produced by amplifier 52 in channel A. Thus, signals $X_a$ and $Y_b$ are in phase as applied to the inputs 10 and 12 of the phase discriminator 30.

Obviously networks 54 and 56 can be reversed in order in channel B; in other words, it will make no difference in the phase of the signals reaching discriminator input 12 whether network 54 is a parallel T-section and 56 is a 90° phase shift network, or vice versa. Likewise, channel B can contain amplifiers at points 57 and/or 58 if desired. The inclusion of amplifiers at both of these points will introduce an additional 360° of shift in the phase of all signals passing through channel B to the discriminator 30, with the result that at inputs 10 and 12 signals $X_a$ and $X_b$ still will be in phase while signals $Y_a$ and $Y_b$ still will be 180° out of phase—the same relationship as that obtaining if there are no amplifiers in channel B.

However, if an amplifier is introduced at only one of the points 57 or 58 the situation as regards phase similarity or phase difference will be reversed. Now it will be signals $Y_a$ and $Y_b$ which are in phase at the inputs 10 and 12 of discriminator 30, while signals $X_a$ and $X_b$ are 180° out of phase. Discriminator 30 will function equally well as an amplitude comparator for the signals X and Y received at input 50 whether it is signal X that has the "in phase" relationship at the discriminator inputs and signal Y that has the "180° out-of-phase" relationship, or vice versa.

In all of the circuit arrangements thus far considered, the basic method which has been employed involves feeding the two signals whose amplitudes are to be compared to a frequency discriminator in such a way that each signal is applied to both inputs of the discriminator, but in one case applying the signal to the respective inputs in a 180° out-of-phase relation, and in the other case applying the signal to both inputs in phase. Although this method can be followed in many if not most situations encountered in practice it actually is not essential that an absolute "in phase" relationship nor an absolute "180° out-of-phase" relationship be employed in the case of the respective signals.

In other words, assuming that signals $X_a$ and $Y_a$ are applied to one input of the phase discriminator and signals $X_b$ and $Y_b$ are applied to the other input, I have ascertained that by proper design entirely satisfactory results can be obtained if the phase difference between signals $X_a$ and $X_b$ is less than ±90°, and the phase difference between signals $Y_a$ and $Y_b$ is more than ±90° but less than ±270°, whereby $X_b$ has a sufficiently substantial in-phase component to be significant and $Y_b$ has a sufficiently substantial out-of-phase component to be significant.

Figure 6:
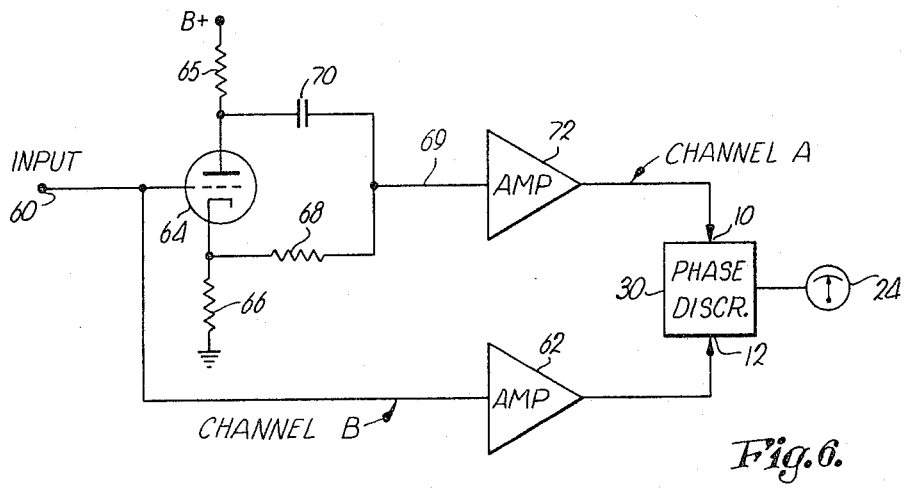

FIG. 6 illustrates, by way of example, an amplitude comparison circuit which meets the latter conditions but in which the phase shift deviates very materially from the arbitrary "in phase" and "180° out-of-phase" conditions discussed earlier. When applied to input 60, signals X and Y travel directly to the control input 12 of the phase discriminator 30 via channel B which contains an amplifier 62. In channel A they are applied to the grid of a tube 64 which has in its plate and cathode circuits resistors 65 and 66, each having a value which is less than one-tenth the value of resistor 68. Capacitor 70 is so chosen that the absolute value of its reactance, at a frequency about midway between the frequencies of signals X and Y, is approximately equal to the resistance 68. (Signal X can be assumed to have a higher frequency and signal Y the lower frequency, for present purposes.) The precise amount of phase shift obtained by this circuit will vary in accordance with the particular values chosen, but, typically, signal X may reach conductor 69 shifted by −135°, while signal Y reaches the same conductor shifted by −45°.

Thereafter, in passing through amplifier 72, both signals are shifted by another 180° (just as is true of the signals passing through amplifier 62 in the other channel) and then they are impressed on the reference input 10 of phase discriminator 30. As impressed on inputs 10 and 12 of the phase discriminator via the respective channels, then, signals $X_a$ and $X_b$ are out of phase by 135°, and signals $Y_a$ and $Y_b$ are out of phase by 45°. With proper adjustment of the gain of amplifier 62 these signals will produce precisely the same results, in terms of the output of discriminator 30, as if $X_a$ and $X_b$ were exactly in phase and $Y_a$ and $Y_b$ were exactly 180° out of phase.

Having explained my method of comparing the strength of two signals, and having given illustrative examples of various circuit arrangements suitable for use in making the comparison, let us now consider a somewhat more elaborate practical embodiment of my invention which, in addition to making use of the principles and certain of the circuits already discussed, achieves further advantages through the dual use of portions of the circuitry in distinctly different ways and for distinctly different purposes. Reference is made to FIG. 9 which shows schematically an omni-localizer converter suitable for use in aircraft. In the omni mode of operation, it affords information as to the aircraft's direction from the transmitting omnirange station, that is to say bearing information. Localizer operation ordinarily is employed only during the landing approach, and gives the pilot "left-right" guidance or orientation relative to the runway.

Basically, both systems make use of two transmitted signals, but the omni signals on one hand and the localizer signals on the other are so different, and the functions and operations involved are so entirely different that it has been the practice in the past to supply aircraft with separate converter circuits to handle the respective operations. The present invention makes it possible to combine the two in a unique way, simplifying the equipment and reducing its cost while at the same time improving reliability and obtaining other advantages.

It will be convenient first to explain the omni mode of operation. As previously suggested, two signals are received by the antenna 75 and applied to the receiver 76. One of them, the "reference-phase" signal, is a carrier modulated with a 9960 c.p.s. subcarrier, the latter being FM modulated at a 30 c.p.s. rate. This signal is transmitted omnidirectionally. The second or "variable-phase" signal is a carrier having a directional pattern that rotates about the omnirange station as a center, turning at a 30 c.p.s. rate. Transmission is adjusted so that the 30 c.p.s. rotary modulation of the variable-phase signal is in phase with the 30 c.p.s. FM modulation of the reference-phase signal in the direction of magnetic north, while, in every other direction, the two are out of phase by an amount indicative of the direction. When received by the converter shown in FIG. 9, in the words, these two 30 c.p.s. signals have a phase relationship that depends on the bearing of the aircraft's position with respect to the omni station.

The output of detector 77 consists of the 9960 c.p.s. signal FM modulated at the 30 c.p.s. rate (the reference-phase signal) and also a 30 c.p.s. AM signal (the variable-phase signal). Both signals are fed through filter 80, this being a 115 cycle reject filter that removes any low frequency audio and residual 120 c.p.s. hum from the transmitter, along with any low frequency voice components. After being amplified at 81 the reference-phase signal and the variable-phase signal are applied via path 82 to the input of a filter 83, and via path 84 to the input of filter 85.

High pass filter 83 eliminates the 30 c.p.s. AM signal and applies the 9960 c.p.s. FM modulated signal through amplifier 87 to the FM discriminator 88. This discriminator spearates the 30 c.p.s. reference-phase signal from the 9960 c.p.s. subcarrier, and feeds this reference signal directly to one input 90 of the phase discriminator 91. The same reference signal also is applied to input 92 of a second phase discriminator 93 after passing through a 90° phase shift network 94. Phase discriminators 91 and 93 can be assumed to be similar to the one discussed in connection with FIGS. 1 and 2.

The 9960 c.p.s. subcarrier (i.e., the reference-phase signal) is eliminated by the low pass filter 85, but the variable-phase signal, being a 30 c.p.s. AM signal, passes therethrough and also through a 60 cycle reject filter 96 which is provided to remove propeller modulation. The signal then passes through the resolver circuitry 96 where it is arbitrarily shifted in phase by a certain amount; the amount of shift is manually adjustable by knob 96a and any change in this amount is accompanied by corresponding adjustment in the bearing indicator dial associated with the resolver. Thus shifted, the 30 cycle variable-phase signal is amplified at 98 and applied directly to the inputs 99 and 100 of the two phase discriminators.

Phase discriminator 91 compares the phase relation of the reference-phase signal applied at input 90 and the shifted variable-phase signal applied at input 99. If these two 30 c.p.s. signals are 90° out of phase, the output of the discriminator will be zero (see FIG. 2) and the pointer of the L–R bearing indicator 102 therefore will remain in center position as shown. This is the situation which obtains when the setting of resolver 96 coincides with the true bearing of the aircraft relative to the omnirange station. It will be evident from FIG. 2 that if the phase difference between the reference and variable signals is more than 90°, or if the phase difference between them is less than 90°, a positive or negative voltage will be produced in the output of the phase discriminator 91, causing the pointer of meter 102 to move correspondingly to the right or left. This means that the amount of phase shift introduced by the resolver 96 is greater than (or less than) the amount of shift needed in order to make the variable-phase signal exactly 90° out of phase with the reference signal applied to input 90 of the discriminator. If the resolver now is readjusted to cause the pointer of meter 102 to return to center position, the setting of the resolver then will coincide with the aircraft's true bearing, and the change in the resolver dial from its former position will be indicative of the amount of deviation that theretofore existed.

Let it be assumed that the aircraft flies a straight course toward the transmitting omni station with the needle of meter 102 centered all the way. If the craft passes the station and continues in the same straight course away therefrom the phase relationship of the signals at inputs 90 and 99 will change from 90° leading to 90° lagging, or vice versa. However, as will be clear from FIG. 2 the output voltage of the phase discriminator 91 is zero regardless of whether the phase difference between the two input signals is −90° or +90°, so the needle of meter 102 will be centered in either case. This meter, in other words, is "blind" to the 180° phase reversal that occurs when the aircraft passes over the transmitting omni station.

Such is not the case with meter 103, for the reason that the reference signal it receives at input 92 is shifted −90° relative to the reference signal received by discriminator 91 at input 90. This means that when the signals received at inputs 90 and 99 of the discriminator 91 have a phase difference of −90°, those received by the corresponding inputs of discriminator 93 will have a phase difference of −180°. Alternatively, when the signals at inputs 90 and 99 of discriminator 91 have a phase difference of +90°, those received at the corresponding inputs of discriminator 93 will be in phase. Thus, when the input signals to discriminator 91 undergo a change in phase relationship from 90° leading to 90° lagging, those reaching discriminator 93 undergo a change from 0° to −180°. In one case discriminator 93 will have a positive output voltage (see FIG. 2) and in the other case it will have a negative output voltage. As a result the "To-From" flag indicator 103 will give a "To" indication when the aircraft is on one side of the transmitting station and a "From" indication when the plane is on the opposite side.

At their respective inputs, as we have seen, the two phase discriminators receive signals of only a single frequency (30 c.p.s.) in the omni mode of operation, the reference signal received by discriminator 93 being shifted 90° relative to the corresponding signal received by discriminator 91. The 30 c.p.s. reference-phase signal and the 30 c.p.s. variable-phase signal for both discriminators are derived from distinctly different forms of wave transmission received from the omnirange station.

The converter is conditioned for operation in the localizer mode by closing switches 105 and 106. Conveniently this may be done automatically in the course of switching the receiver 76 over to accept the localizer transmission frequency of a particular station. Designed to aid the pilot in lining his aircraft up with an airport runway in the course of making a landing approach, the localizer beam is transmitted axially of the runway by directional antennae having overlapping field patterns. The same high frequency carrier is employed for both patterns this being amplitude modulated with a 150 c.p.s. signal in the case of one pattern, and with a 90 c.p.s. signal in the case of the second pattern. The proper "left-right" course for a landing approach is indicated by the line where the overlapping patterns produce signals of equal strength. Thus, to the right of the runway axis, the amplitude of the 150 c.p.s. signal will be greater than that of the 90 c.p.s. signal, and to the left of the runway axis the reverse will be true. This obviously calls for a comparison of the amplitude of the two signals, whereas a comparison of phase was involved in the omni mode of operation previously described.

The received signals are fed by the receiver 76 to the detector 77, whose output therefore consists of a pair of audio frequency signals of 90 c.p.s. and 150 c.p.s., respectively, the amplitude of each depending upon the position of the aircraft within the localizer beam. The two signals are fed via path 108 and closed switch 105 directly to the input 90 of phase discriminator 91; after being shifted in phase −90° by the network 94, they likewise are impressed on input 92 of phase discriminator 93.

From the output of detector 77 the 90 c.p.s. and 150 c.p.s. signals also are fed to a 115 cycle reject filter where they are attenuated equally and then impressed on the input of amplifier 81. After amplification, they proceed through the 30 cycle low pass filter 85 and closed contact 106 to the amplifier 98 which then impresses them on the inputs 99 and 100 of phase discriminators 91 and 93.

FIG. 11 is a vector diagram illustrating the relative phase positions of the 90 c.p.s. signal at points A, B, C and D in FIG. 9. The relative phase positions of the 150 c.p.s. signal at the same points is shown in FIG. 12. The vectors are not meant to indicate signal amplitude in any case. Beginning with the assumption that vectors A indicate the position of 90 c.p.s. and 150 c.p.s. signals as they leave detector 77, it can be said immediately that vectors A likewise represent the phase position of the two signals when impressed on input 90 of phase discriminator 91. Both signals are shifted −90° before reaching input 92 of the other discriminator, however, as indicated by vectors D in FIGS. 11 and 12.

En route from point A to inputs 99 and 100 of the discriminators, the two signals are shifted in phase by filter 80, amplifier 81, filter 85 and amplifier 98. The effect of the two amplifiers (81 and 98) can be disregarded for, together, they shift the signals a total of 360°—a net angular change of zero.

The 115 cycle reject filter 80 is a slightly modified version of the parallel T-section network 46 discussed in connection with FIGS. 4, 7 and 8. If network 46 were to be used without modification as the reject filter 80 it would serve to shift the 90 c.p.s. signal by −90° while shifting the 150 c.p.s. signal by +90°. However, for filter 80 I prefer to use the network shown in FIG. 10, which differs only in the addition of the resistor 110 across the network in order to "spoil" the perfect phase shift that otherwise would be obtained. As a result, the 90 c.p.s. signal is shifted somewhat less than −90° and the 150 c.p.s. signal is shifted somewhat less than +90°. This is illustrated by vectors B in FIGS. 11 and 12.

When they pass through filter 85 both signals are shifted −90° so that, whether the additional 360° shift produced by amplifiers 81 and 98 is taken into consideration or disregarded, the two signals reach point C (FIG. 9) with the phase angles shown by vectors C in FIGS. 11 and 12. And these are the phase angles at which the respective signals are impressed on inputs 99 and 100 of the phase discriminators.

Taking vector A (FIG. 12) as the reference signal applied to input 99 of discriminator 91, it will be seen from the vector C that at the other input 99 the 150 cycle signal has a very substantial "in phase" component. On the other hand it is clear from vectors C and A (FIG. 11) that the 90 c.p.s. signal at input 99 has a substantial component that is in "180° out-of-phase" relation to the 90 c.p.s. signal at input 90. The in-phase component of the 150 c.p.s. signal at the respective inputs urges meter 102 in one direction, while the out-of-phase component of the 90 c.p.s. signal at the respective inputs urges the meter in the opposite direction. If the aircraft in its landing approach is correctly aligned with the localizer beam the strength of the 90 c.p.s. and the 150 c.p.s. signals will be equal and, by exerting equal and opposite effects on meter 102, will cause the needle of the meter to remain centered. However, if the aircraft is to the right or left of its correct approach path the inequality in the strength of the received signals will cause meter 102 to shift to the right or left.

In the case of phase discriminator 93, let it be remembered that due to the phase shift introduced by network 94 the reference-phase signals applied to input 92 have the phase positions shown by vectors D in FIGS. 11 and 12. As shown by vectors C, both the 90 c.p.s. signal and the 150 c.p.s. signal at input 100 have significant components in phase with the reference signals of corresponding frequency at input 92. Accordingly both signals exert an effect in the same sense; in other words, the output of phase discriminator 93 reflects the sum, rather than the difference, of their in-phase components, and this output is impressed on meter 103.

Under normal conditions, their combined magnitude will be ample to cause the "To-From" flag of indicator 103 to deflect to the "To" position. In the event that the equipment transmitting the localizer beam should cease to function, however, the flag will immediately drop out of the "To" position, warning the pilot that he cannot rely upon meter 102 to indicate whether the aircraft is on the proper approach path. By the same token, if the signals received by my converter are too weak for reliable operation, for example due to the position of the aircraft relative to the field patterns of the "left" or "right" signals or perhaps due to some peculiarity in the distribution pattern of the signals themselves, the decrease in the output of phase discriminator 93 likewise will cause the flag of indicator 103 to drop from its "To" position as a warning to the pilot.

Thus according to the invention, it is possible to use frequency discriminators for comparing the amplitude of electrical signals by subtraction, or to employ them for adding the electrical quantities under consideration, in an integrated system which uses the same discriminators in still other distinctly different ways and for distinctly different purposes, such as obtaining bearing information from the signals transmitted by omnirange stations.

From the foregoing it will be seen that my invention is one well adapted to attain all of the ends and objects hereinbefore set forth, together with other advantages which are obvious and which are inherent to the method and apparatus.

It will be understood that certain features and subcombinations are of utility and may be employed without reference to other features and subcombinations. This is contemplated by and is within the scope of the appended claims.

Inasmuch as various possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. In a combined omni-localizer converter for an omni-localizer receiver having a detector output, a phase shifting network connected to said detector output to receive signals therefrom, said network having an output, a phase discriminator having a pair of inputs, a first omni signal channel connecting the output of said network to one input of said phase discriminator, a second channel for supplying omni signals from the output of said network to the other input of said discriminator, adjustable means in the first channel for shifting, by a controllable amount, the phase of signals passing therethrough, other means in said first channel for shifting, by a fixed amount, the phase of signals passing therethrough, frequency modulation discriminating means in said second channel, a third channel for feeding localizer signals from said detector output to said other input of said phase discriminator, mode selection means selectively operable to disable said third channel in order to permit the omni mode of operation or to disable said second channel in order to permit operation in the localizer mode, and a localizer signal channel controlled by said mode selection means to by-pass said adjustable phase shifting means for operation in the localizer mode.

2. A converter as in claim 1, wherein said phase shifting network comprises a parallel T-section filter having a rejection frequency approximately midway between the localizer signal frequencies.

3. A converter as in claim 1, including a second phase discriminator having two inputs corresponding respectively to the two inputs of the first phase discriminator, a connection from each input of said second phase discriminator to the corresponding input of the first phase discriminator, and phase shifting means in at least one of said connections.

4. In a receiver for first and second localizer signals, a localizer signal detector having an output, a phase discriminator having two inputs and an output, a first channel for feeding said localizer signals from said output of the detector to one of said phase discriminator inputs, a second channel for feeding said localizer signals from said output of the detector to the other input of said phase discriminator, phase shifting means in one of said channels, and a localizer signal indicator connected to the output of said phase discriminator to indicate the difference in amplitude of the respective localizer signals.

5. A receiver as in claim 4, wherein said phase shifting means is frequency sensitive, whereby the phase of the first localizer signal is shifted by a certain amount and the phase of the second localizer signal is shifted by a different amount.

6. A receiver as in claim 4, wherein the localizer signals received by said phase discriminator via said first channel are relatively unshifted in phase; wherein said first localizer signal received by said phase discriminator via said second channel likewise is relatively unshifted in phase, and wherein said second localizer signal received by said phase discriminator via said second channel is shifted in phase by substantially 180°.

7. In a localizer system of the type adapted to receive a localizer transmission which includes a first signal and a second signal, the improvement comprising a phase discriminator having a pair of inputs, means for shifting the phase of said first signal substantially 180°, means for impressing said shifted first signal on one of the inputs of said discriminator and concurrently impressing thereon the relatively unshifted second signal, means for concurrently impressing the relatively unshifted first and second signals on the other input of said discriminator, said phase discriminator having an output proportional to the difference in amplitude of the original unshifted signals, and means registering the output of the phase discriminator.

8. In a localizer system of the type adapted to receive a localizer transmission which includes a first signal and a second signal, the improvement comprising means for shifting the phase of said first signal by an angle of less than 90°, means for shifting the phase of said second signal by an angle of more than 90° but less than 270°, unitary means for comparing the phase of both shifted signals with that of the same signals in relatively unshifted condition, said phase comparing means having an output proportional to the difference in amplitude of the original unshifted signals, and means for registering said output.

9. In a localizer system of the type adapted to receive a localizer transmission which includes a first signal and a second signal, the improvement comprising means for shifting the phase of said first signal clockwise substantially 90° and shifting the phase of said second signal counterclockwise substantially 90°, means for reshifting the phase of both phase-shifted signals substantially 90° in the same direction, unitary means for comparing the phase of both twice-shifted signals with that of the same signals in relatively unshifted condition, said phase comparing means having an output proportional to the difference in amplitude of the original unshifted signals, and means for registering said output.

10. In a system for comparing the amplitude of two alternating current signals which differ from one another in frequency, a phase discriminator having a pair of inputs, a first channel via which both of said signals are fed to one of said inputs, a second channel via which both of said signals are fed to the other of said inputs, phase shifting means in said second channel, phase shifting means in said first channel whereby the signal of one frequency impressed on said one input has a component in phase with the signal of the same frequency impressed on said other input, and other phase shifting means in said first channel whereby the signal of the other frequency impressed on said one input has a component 180° out of phase with the signal of said other frequency impressed on said other input.

11. A system as in claim 10, wherein said phase discriminator has an output, said discriminator being of the type wherein no signal is produced in said output when signals of the same frequency in quadrature phase relation are impressed on the respective inputs of said discriminator.

12. A system as in claim 10, wherein one of said phase shifting means comprises a parallel T-section resistive-capacitative network having a rejection frequency substantially midway between the frequencies of said signals.

13. In a system for comparing the amplitude of two alternating current signals which differ from one another in frequency, a phase discriminator having a pair of inputs, a first channel via which both of said signals are fed to one of said inputs, a second channel via which both of said signals are fed to the other of said inputs, means in the first channel for altering the strength of the signals en route to said one input, means in the second channel for altering, by a different amount, the strength of the signals en route to said other input, phase shifting means in said second channel, phase shifting means in said first channel whereby the signal of one frequency impressed on said one input has a component in phase with the signal of the same frequency impressed on said other input, and other phase shifting means in said first channel whereby the signal of the other frequency impressed on said one input has a component 180° out of phase with the signal of said other frequency impressed on said other input.

14. In a system for comparing the amplitude of two alternating current signals which differ from one another in frequency, a phase discriminator having a pair of inputs, a first channel via which both of said signals are fed to one of said inputs substantially without any shift in phase, a second channel via which both of said signals are fed to the other of said inputs, and frequency selective phase shifting means in said second channel whereby the signal of one frequency impressed on said other input has a component 180° out of phase with the signal of the same frequency impressed on said one input, and whereby the signal of the other frequency impressed on said other input has a component in phase with the signal of the same frequency impressed on said one input.

15. A system as in claim 14, wherein said phase discriminator has an output, said discriminator being of the type wherein no signal is produced in said output when signals of the same frequency in quadrature phase relation are impressed on the respective inputs.

16. A system as in claim 14, wherein said frequency selective phase shifting means comprises a parallel T-section resistive-capacitative network having a rejection frequency substantially midway between the frequencies of said signals.

17. A system as in claim 14, wherein at least one of the signals impressed on said other input via said second channel has a component in quadrature phase relation to the signal of the same frequency impressed on said one input.

18. A system as in claim 17, including a second phase discriminator having a pair of inputs corresponding respectively to said two channels, a connection from each input to its corresponding channel, and phase shifting means in at least one of said connections.

19. In a system for comparing the amplitude of two alternating current signals which differ from one another in frequency, a phase discriminator having a pair of inputs, a first channel via which both of said signals are fed to one of said inputs substantially without any shift in phase, a second channel via which both of said signals are fed to the other of said inputs, means in the first channel for altering the strength of the signals en route to said first input, means in the second channel for altering, by a different amount, the strength of the signals en route to said other input, and frequency selective phase shifting means in said second channel whereby the signal of one frequency impressed on said other input has a component 180° out of phase with the signal of the same frequency impressed on said one input, and whereby the signal of the other frequency impressed on said other input has a component in phase with the signal of the same frequency impressed on said one input.

20. The method of comparing the amplitude of two alternating current signals of different frequency comprising the steps of applying the signal of one frequency to both inputs of a phase discriminator, concurrently applying the signal of the other frequency to both inputs of the phase discriminator, maintaining the signal of said one frequency as applied to one of said inputs substantially in phase with the signal of the same frequency as applied to the other of said inputs, and maintaining the signal of said other frequency as applied to one of said inputs substantially 180° out of phase with the signal of the same frequency as applied to said other input.

21. The method of claim 20, including the step of adjusting the amplitude at which both signals are applied to a particular one of said inputs so as to be greater than the amplitude of the signals applied to the other input of the discriminator.

22. The method of comparing the amplitude of two alternating current signals of different frequency, comprising the steps of feeding one of the signals to both inputs of a phase discriminator, concurrently feeding the other of said signals to both inputs of the phase discriminator, so shifting the phase of said one signal en route to the respective inputs that it is out of phase more than 90° but less than 270° at the repective inputs, and so shifting the phase of said other signal en route to the respective inputs that it is out of phase less than 90° at the respective inputs.

23. The method of claim 22, including the step of amplifying both signals en route to the same one of said discriminator inputs, and amplifying both signals, but by a different amount, en route to the other discriminator input.

24. The method of claim 22, including the step of amplifying both signals en route to a particular one of said discriminator inputs, and attenuating both signals en route to the other discriminator input.

25. The method of claim 22, including the step of so changing the strength of the signals en route to said discriminator inputs that one input receives both signals at a relatively higher level of signal strength than does the other input.

26. The method of comparing the amplitude of two alternating current signals of different frequency, comprising the steps of applying both of the signals, substantially unshifted in phase, to one input of a phase discriminator, concurrently applying one of said signals, shifted in phase by less than 90°, to the second input of the phase discriminator, and concurrently applying the other of said signals, shifted in phase by more than 90° but less than 270°, to said second input of the phase discriminator.

27. The method of registering the sum and difference in amplitude of two alternating current signals differing in frequency, comprising the steps of applying both of the signals, substantially unshifted in phase, to one input of a phase discriminator, concurrently applying both of the signals, shifted in phase by approximately 90°, to one input of a second discriminator, concurrently applying one of said signals, shifted in phase by less than 90° to the second input of each of said discriminators, and concurrently applying the other of said signals, shifted in phase by more than 90° but less than 270°, to the second input of each of said discriminators.

28. In a receiver for first and second localizer signals, a localizer signal detector having an output, a phase discriminator having two inputs, a first channel for feeding said localizer signals from said output of the detector to one of said phase discriminator inputs, a second channel for feeding said localizer signals from said output of the detector to the other input of said phase discriminator, phase shifting means in said first channel whereby the localizer signals received by the phase discriminator via said channel are shifted in phase by 90°, phase shifting means in said second channel whereby one localizer signal received by said phase discriminator via said second channel is shifted in phase by an angle of less than 90° and the other localizer signal is shifted in phase by an angle of more than 90° but less than 270°, said phase discriminator having an output proportional to the sum of the amplitudes of the original unshifted signals, and means for registering said output of the phase discriminator.

References Cited by the Examiner

UNITED STATES PATENTS

| 2,418,284 | 4/1947 | Winchell et al. | 324—140 X |
| 2,706,274 | 4/1955 | Boyer | 328—146 X |
| 3,058,067 | 10/1962 | Camnitz. | |
| 3,137,814 | 6/1964 | Cook | 324—83 X |

CHESTER L. JUSTUS, *Primary Examiner.*

H. C. WAMSLEY, *Assistant Examiner.*